Figure 1:
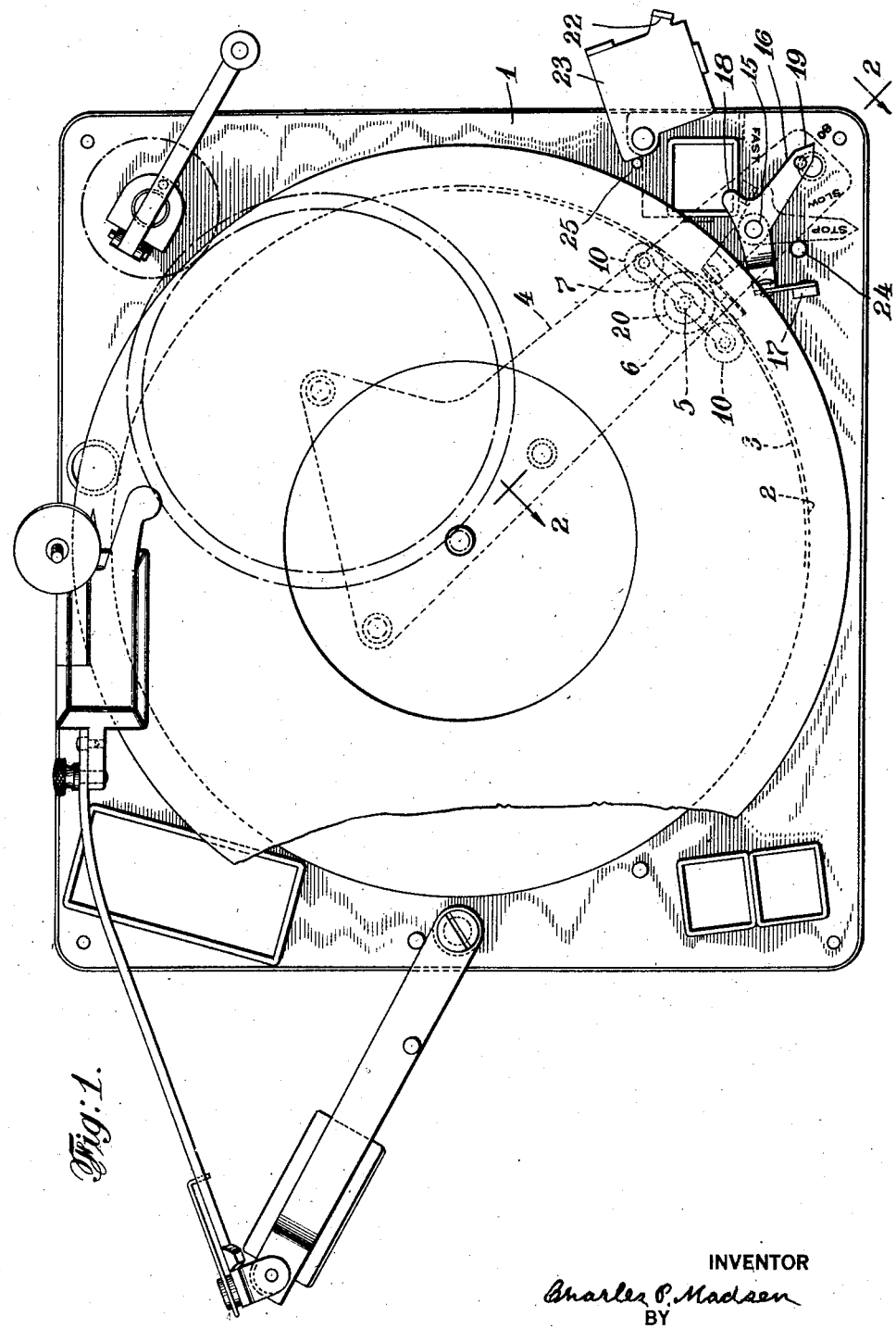

Oct. 15, 1929.  C. P. MADSEN  1,731,784
GOVERNOR
Filed Dec. 30, 1925  3 Sheets-Sheet 1

INVENTOR
Charles P. Madsen
BY
William W. Varney
ATTORNEY

Oct. 15, 1929.  C. P. MADSEN  1,731,784
GOVERNOR
Filed Dec. 30, 1925    3 Sheets-Sheet 2
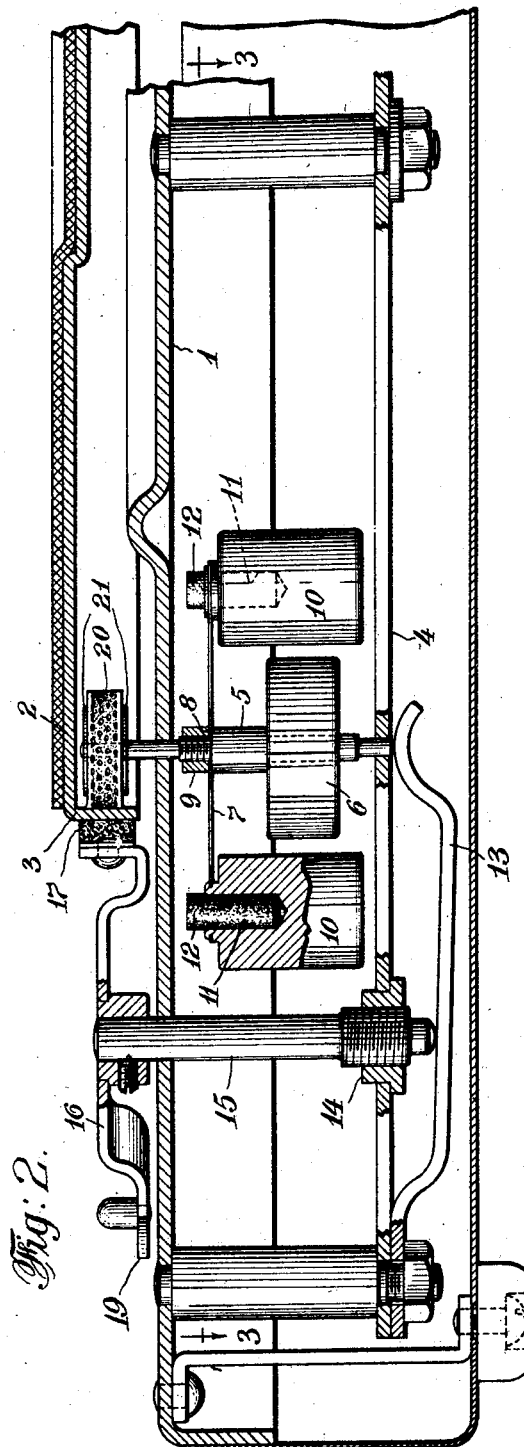
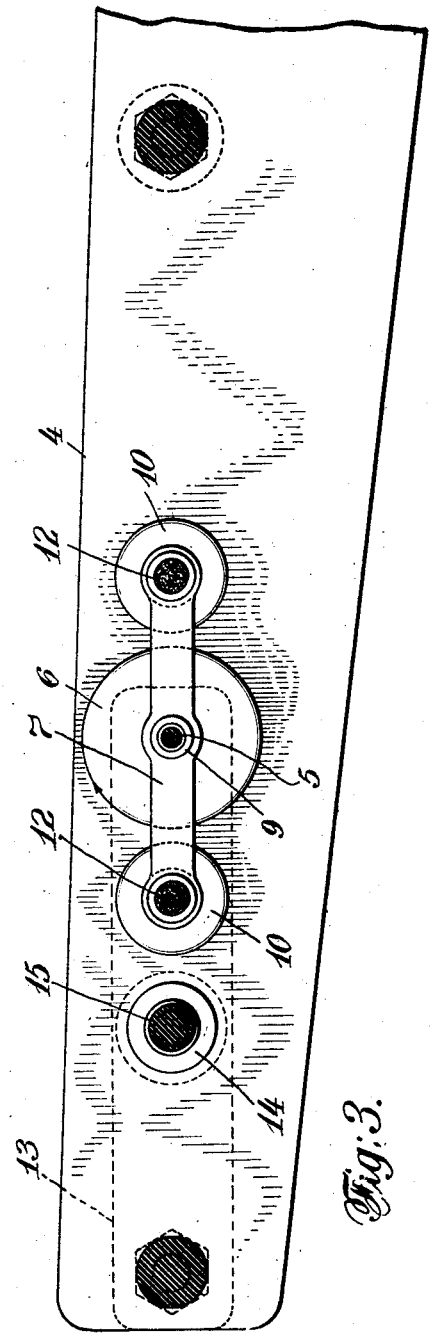
INVENTOR
Charles P. Madsen
BY
William W. Varney
ATTORNEY Oct. 15, 1929.  C. P. MADSEN  1,731,784
GOVERNOR
Filed Dec. 30, 1925   3 Sheets-Sheet 3

INVENTOR.
Charles P. Madsen
BY
William W. Varney
ATTORNEYS.

Patented Oct. 15, 1929

1,731,784

UNITED STATES PATENT OFFICE

CHARLES P. MADSEN, OF NEW YORK, N. Y., ASSIGNOR, BY MESNE ASSIGNMENTS, TO WILLIAM W. VARNEY, OF BALTIMORE, MARYLAND

GOVERNOR

Application filed December 30, 1925. Serial No. 78,491.

My invention relates to that class of mechanical devices used for obtaining power at a relatively constant speed from a variable power or a constant power of variable speed. A good example of a machine requiring this type of device is a phonograph and in this case the device is called a governor.

An object of my invention is to provide a governor which will maintain a more nearly constant speed with a greater variation in the power supplied than has heretofore been possible, and which is free from the throbbing or fluttering phenomena and which, at the same time, is more compact and cheaper to build than present forms of governors.

A further object of my invention is the providing of a governor of extreme sensibility, or great response per unit of speed change.

A further object of my invention is the providing of a governor noiseless in operation and especially non-throbbing in its action.

A further object of my invention is the construction of a governor simple to make and almost free from errors of manufacture when in quantity production.

With the foregoing and other objects in view, my invention consists of the methods employed, combinations and arrangement of systems, apparatus and means as hereinafter specifically provided and illustrated in the accompanying drawings wherein is shown the preferred embodiment of my invention, but it is understood that changes, variations and modifications may be resorted to which come within the scope of the claims hereunto appended.

While my governor is intended primarily for phonographs and more particularly for the portable phonograph disclosed in my co-pending application Serial No. 27,206, it may be used for other types of phonographs and it is also useful for other constant speed apparatus.

The best known mechanical means of obtaining a relatively constant speed from a variable speed source consists in driving a rotating friction member coupled with spring and weights in such a manner that a slight change in speed causes a comparatively great change in friction exerted by the friction rotating member. It has been customary to use a plurality of weights mounted upon a plurality of springs all co-acting in common upon a friction collar or disc, which in turn has applied thereto the friction at one and sometimes two independent points. This character of governor is known as the Pickering governor. The result of this construction is that the slightest variation in the mass or position of the weights and in the size or resilience of the springs causes rotation of the weights in unequal circles, thereby setting up an in and out motion while revolving. This fact has been called squaring because the masses appear to travel in a square instead of a circle. Not only does this effect cause noise but it interferes with the performance of the device and, furthermore, the slightest degree of unbalance, even though not sufficient to start the throbbing, will do so when the power varies suddenly due to uneven unwinding of the spring, in the case of a spring motor or other mechanical defects. To overcome these troubles requires a precision of construction which makes their cost almost prohibitive.

I have found that by using only two weights, disposed at the opposite ends of a single spring, with the axis of rotation through the center of the spring, and at right angles thereto, and with a friction member mounted upon each weight, co-acting with an independent stationary member, the center of gravity of the weight in normal position being in a different plane of rotation than that of the spring, these troubles are overcome, provided of course the members are correctly proportioned. Not only does this arrangement prevent the phenomena of squaring but if the proportions are correct it controls more accurately—that is, the rate of friction change per rate of speed change is greater.

When used on a machine which runs at one constant speed the non-rotating member against which the friction members co-act may be fixed. When, however, it is used with a machine such as a phonograph, in which it is desirable to change the speed while running, then the relative position of the fixed friction surface to that of the plane of rotation of the friction wicks or point of fastening of the weights at a relative given speed must be alterable. This may be accomplished in various ways. When used in connection with my new phonograph, as illustrated, however, I prefer to provide this adjustment by shifting the whole of the revolving system with relation to a fixed plate.

Figure 5:
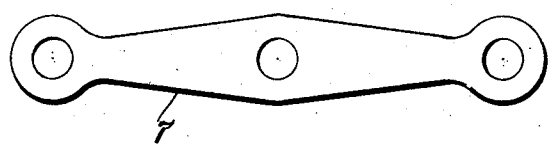
Figure 4:
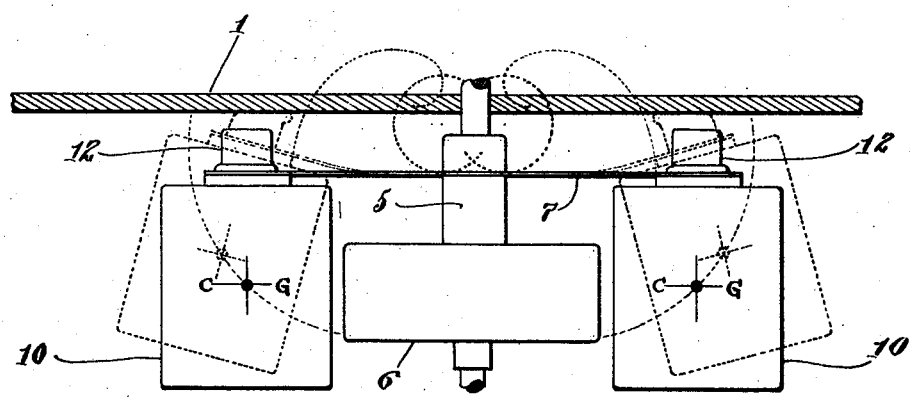

In the drawing of the herein described embodiment of my invention, I have shown the governor as applied to the portable phonograph disclosed in my pending application above mentioned, Fig. 1 being a plan view of the same open and in position for playing; Fig. 2 is an enlarged sectional view taken through 2—2 of Fig. 1. Fig. 3 being a plan view of the section shown in Fig. 2 taken through and looking in the directions of the arrows 3—3 of Fig. 2; Fig. 4 is an enlarged view of the governing elements shown with reference to the stationary covering or top plate, particularly intended to show the action of the governor in operation; Fig. 5 shows a view of the spring 7 shaped to give more sensitive response when lighter weights 10 are desired.

Similar numerals refer to similar parts throughout the several views. 1 is a top plate which acts as the stationary friction member; 2 and 3 form the turn table upon which the record is placed or is the member that it is desired to revolve with a constant speed, and which my governor is intended to control. 4 is a supporting plate in which the spindle 5 of my governor is journalled. 6 is a governor weight. 7 is the spring controlling the operations of my governor. The construction of this spring is important both as to shape and material. Where extreme sensitiveness is required, coupled with quick response a shape similar to that shown in Fig. 5 is desirable or such a proportioning of the spring as to give the response desired. The material of the spring is also quite important as great durability and constancy of action, coupled with endurance is desirable. I found that a tungsten high carbon steel is preferable. Spring 7 is mounted on a shoulder on spindle 5 by having a hole therein 8 and is secured by lock nut 9.

10 are the governor weights secured preferably at one end thereof to spring 7 by any convenient means. I have shown by burring. In governor weight 10 there is an opening or cavity 11 in which I secure braking or friction wick 12. I find a fine grade of felt very satisfactory for this purpose, forming a felt plug which in operation contacts with top plate 1 in braking effect.

13 is an adjusting or regulating member, one end of which is secured to supporting plate 4 and the other end is free and supports the end of spindle 5. This member is resilient to a certain extent and is adjusted by means of adjusting screw 15, operating in nut 14, secured in supporting plate 4. Adjusting screw 15 is operated by operating dial pointer 16 which member is provided with brake 17, locking member 18 and dial point 19.

On the end of spindle 5 is air suction wheel 20 which is driven by the flange of platen 3 and which drives spindle 5. This air suction wheel consists of a resilient porous flexible material as shown of sponge rubber clamped between clamping means 21.

22 is a locking lug to engage locking member 18 when cover 23 is in position. 24 is a stop to limit the movemnt of operating dial pointer 16 and 25 is a stop to limit the movement of cover 23.

To obtain a clearer idea of the operation of this new method of governing, reference is made to Fig. 4 which shows diagrammatically the position of the weights or balls at rest and when revolving at approximately the speed of control and also the change of shape of the spring 7. It is clear that as the speed increases it will be seen that the end or supporting point of the spring follows approximately an involute curve and that the center of gravity G of the balls rises very rapidly with a circular characteristic. The result is a high rate of development of pressure of the friction members 12 against the fixed plate 1. Because of the fact that the action of the centrifugal force of the balls or weights is to develop a twisting action on the spring, the distance of movement of the balls against the friction surface and the pressure developed is greater per change of revolution than is obtained in governors of the old type wherein the pull of the balls is only at right angles to the plane of revolution resulting in the upward thrust or pressure being only the difference between the original length of the spring and the hypotenuse of the triangle which it forms when the balls are revolving.

To illustrate the effect of this in a practical way, the following example obtained by actual test may be cited. In the type of spring motor shown in the phonograph illustrated in Fig. 1 and described and claimed more fully in co-pending application the ratio of speed reduction is such that it is necessary to use a longer mainspring than is heretofore used in standard practice. As for instance, when standard proportions are followed this spring should be 8 feet long, but I have found it necessary in this case to make it 12 feet long. When this is done, the work placed upon the governor or regulatnig means is far more severe. Not only is the rate of drop of the torque from fully wound spring to unwound greater but such a spring also will flutter or chug more; that is, unwind unevenly. When the standard type of governor known as the Pickering governor was used, it was found that the variation in speed control was plus or minus two revolutions and the total loss in revolutions of the turn table in three minutes was from six to eight per minute. With my new governor, used under the same conditions, the variation in speed was plus or minus one-quarter revolution and the total drop in three minutes two revolutions per minute.

Having thus described my invention what I claim and desire to secure by Letters Patent is:

1. A governor comprising a journalled member provided with flexibly supported mass members in a line off the center of gravity of the same whereby centrifugal force tends to move said members longitudinally with reference to said spindle by flexing the supporting means thereof and a contacting means relatively stationary with reference to said spindle against which said mass members may contact.

2. A governor comprising a revolving journalled member provided with flexibly supported mass members, the center of gravity of which is in a different plane from the attaching means whereby the centrifugal force in the revolving thereof tends to move said members longitudinally with reference to said journalled member by flexing the supporting means thereof, and means for moving said journalled member longitudinally in its journal with reference to a contacting means and a contacting means against which said mass members may contact in their longitudinal movement with respect to said journalled member.

3. A governor comprising a revolving journalled member provided with flexibly supported mass members, the center of gravity of which is in a different plane from the attaching means whereby the centrifugal force in the revolving thereof tends to move said members longitudinally with reference to said journalled member by flexing its supporting means and a contacting means against which said mass members may contact in their longitudinal movement with said journalled member, and means for regulating said journalled member longitudinally with reference to said contacting means.

4. In a governor provided with a revolving journalled member provided with flexibly supported mass members integral therewith, the center of gravity of which is in a different plane from the attaching means whereby the centrifugal force in the revolving thereof tends to move said members longitudinally, said mass member being provided with a yieldable rubbing member.

5. A governor comprising a revolving journalled member provided with flexibly supported mass members integral therewith, the center of gravity of which is in a different plane from the attaching means whereby the centrifugal force in the revolving thereof tends to move said members longitudinally with reference to said journalled member and a contacting means against which said mass members may contact in their longitudinal movement with said journalled member, and means for regulating said journalled member longitudinally with reference to said contacting means consisting of an end support and means of regulating the same.

6. A governor comprising a revolving journalled member provided with flexibly supported mass members integral therewith, the center of gravity of which is in a different plane from the attaching means whereby the centrifugal force in the revolving thereof tends to move said members longitudinally with reference to said journalled member and a contacting means against which said mass members may contact in their longitudinal movement with said journalled member, and means of regulating said journalled member longitudinally with reference to said contacting means consisting of an end support and means for regulating the same, said means consisting of a regulating handle operating a screw which bears against said end support, said support being yieldable.

7. A governor comprising a revolving journalled member provided with flexibly supported mass members integral therewith, the center of gravity of which is in a different plane from the attaching means whereby the centrifugal force in the revolving thereof tends to move said members longtudinally, said mass member being provided with a yieldable rubbing member consisting of felt attached to said mass members.

8. In an organized governor, a weight, a support for said weight, said weight revolving around a center exterior thereof and the center of gravity of which is without the plane of rotation of the support of said weight thus forming a bending couple with reference to said plane of rotation to operate a governing means and means causing the point of support of said weight to follow substantially the path of an involute normal to the plane of rotation upon a change of speed of rotation.

9. A speed control comprising a spindle revolving with reference to a moving body to be controlled, said spindle being provided with a relatively stationary inertia mass and also being relatively movable longitudinally with reference to said body to be governed, a braking member, a moving member to contact against said braking member, said moving member being integral with and flexibly supported by said spindle.

10. A speed control comprising a spindle revolving with reference to a moving body to be controlled, a braking member, a moving member to contact against said braking member said moving member being integral with and flexibly supported by said spindle.

11. In an organized governor, a weight revolvable around a center exterior thereof, a rotatable flexible support for the weight, and a relatively stationary braking means, the plane of rotation of said support being intermediate the parallel planes containing respectively the center of gravity of the weight and the braking means, whereby on rotation of said parts the weight is caused to flex the support and to contact with the braking means.

CHARLES P. MADSEN.